M. HERING.
METHOD OF MANUFACTURING CARRIER RINGS FOR SOLID RUBBER TIRES.
APPLICATION FILED SEPT. 17, 1921.

1,413,331. Patented Apr. 18, 1922.

Inventor:

UNITED STATES PATENT OFFICE.

MAX HERING, OF RONNEBURG, SACHSEN-ALTENBURG, GERMANY.

METHOD OF MANUFACTURING CARRIER RINGS FOR SOLID-RUBBER TIRES.

1,413,331.  Specification of Letters Patent.  Patented Apr. 18, 1922.

Application filed September 17, 1921. Serial No. 501,479.

*To all whom it may concern:*

Be it known that I, MAX HERING, a citizen of the German Republic, and residing at Ronneburg, Sachsen-Altenburg, Germany, have invented new and useful Improvements in a Method of Manufacturing Carrier Rings for Solid-Rubber Tires, for which I have filed application in Germany on the 18th of February, 1920, and of which the following is a specification.

My invention relates to carrier rings for solid rubber tires which are vulcanized on, which carrier rings are pressed onto vehicle wheels laterally in the well known manner. It is the object of my invention to provide a method of producing such carrier rings out of flat material. Moreover, my novel method enables me to dispense with comparatively expensive turning work by using a flat material having those grooves into which the rubber tire is to be vulcanized, produced during the treatment of said flat material within the rolling mills, and imparting to the ring the required accurate internal diameter by radially forcing said ring on to a core piece.

Hitherto, such carrier rings have been rolled in a seamless form. This method of manufacture produces tires which, in its true, answer all requirements in every respect, but is expensive in itself. The carrier rings have, for this reason, also been bent up out of flat material and the ends welded to each other in a fire. The disadvantage of this fire welding is, however, that the parts in the vicinity of the welded joints become too highly heated. This disadvantage becomes frequently manifest in practice by the carrier rings bursting either when pressed on or during running. If this bursting takes place when the ring with the tire is being laterally pressed on to the wheel, the expensive rubber tire is thereby wasted. In the electrical method of butt welding it is true that the danger of excessive heating outside the welded joint is avoided, but the electrical method of welding lacks the rolling into each other of the masses of material which are to be connected together and which is necessary for a weld which will withstand tensile strains. For these reasons the electrical method of butt welding has hitherto not been suitable for such carrier rings.

It is another object of my present invention to make the electrical method of butt welding suitable for carrier rings of the present kind and it consists in providing the ends of the joint, which are to be butt welded to each other, previous to welding, with inter-locking and undercut teeth which will stand the tensile strains to which the ring is subjected, and in this way relieve the welded seam of strain.

An example of the manner in which the invention is carried out is illustrated in the accompanying drawings, in which.

The carrier ring $a$ is provided on its external circumference with grooves $f$ into which the solid rubber tire $b$ is vulcanized. The ring $a$ is bent up out of flat steel, the ends of which interlock by means of undercut teeth $c$ and $d$. After this connection has been effected the teeth are welded to each other by means of the method of electrical resistance welding or autogenously. The interlocking teeth $c$ and $d$ absorb the tensile strains set up in direction of the periphery of the carrier ring so that the weld only acts as a supplementary safety device.

Figures 1, 2:
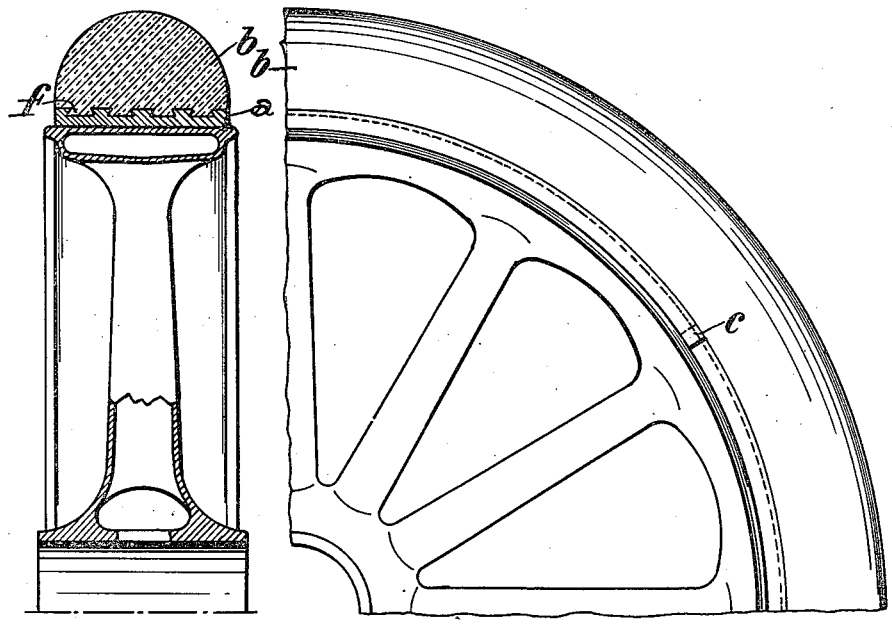
Figure 1 is an axial transverse section through a wheel with the carrier ring according to the present invention and Figure 2 is a partial elevation from the side.
Figures 3, 4:
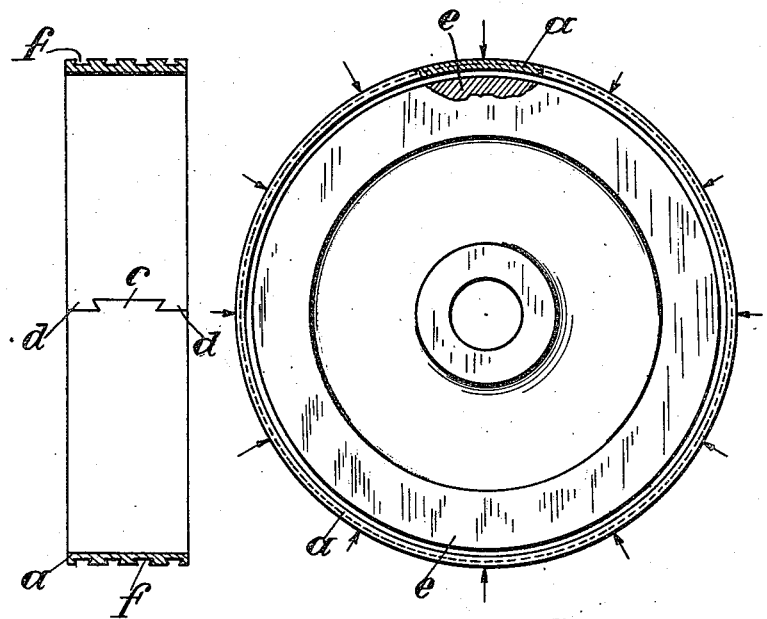
Figure 3 shows the carrier ring in longitudinal section with an elevation of the joint.
Figure 4 illustrates the manner of compressing the ring to an accurate diameter by forcing it upon a core piece.

According to the present invention the carrier ring $a$ is no longer turned to an accurate internal diameter as this diameter is obtained by radially forcing it on to a core piece $e$ (see Fig. 4). This core piece $e$ may be composed of parts which can be taken apart or may consist of a single piece. In the latter case the compressed ring is removed from the core piece $e$ by being forced off it laterally.

According to the present invention the grooves $f$ are rolled in the flat steel when it is being manufactured and before it is bent up to form the ring so that the carrier ring is produced in a purely mechanical way and of dimensions which are fixed once and for all and are not dependent upon the varying attention of the workman.

What I claim as my invention and desire to secure by Letters Patent of the United States of America, is:—

1. A method of manufacturing a carrier ring for a solid rubber tire, consisting in, bending a cut length of flat steel into a ring, cutting into the ends of said ring interengaging teeth, and welding said ends after said teeth have been joined so as to engage each other.

2. A method of manufacturing a carrier ring for a solid rubber tire, consisting in, conjointly rolling into a flat steel band grooves while said flat steel band is being rolled out to final dimensions, bending a cut length of said flat steel into a ring, cutting into the ends of said ring interengaging teeth, and welding said ends after said teeth have been joined so as to engage each other.

3. A method of manufacturing a carrier ring for a solid rubber tire, consisting in, bending a cut length of flat steel into a ring, cutting into the ends of said ring interengaging teeth, and electrically butt welding said ends after said teeth have been joined so as to engage each other.

4. A method of manufacturing a carrier ring for a solid rubber tire, consisting in, conjointly rolling into a flat steel band grooves while said flat steel band is being rolled out to final dimensions, bending a cut length of said flat steel into a ring, cutting into the ends of said ring interengaging teeth, and electrically butt welding said ends after said teeth have been joined so as to engage each other.

5. A method of manufacturing a carrier ring for a solid rubber tire, consisting in, bending a cut length of flat steel into a ring, cutting into the ends of said ring interengaging teeth, welding said ends after said teeth have been joined so as to engage each other, and compressing said so welded ring to the required accurate internal diameter by radially forcing it upon a core piece.

6. A method of manufacturing a carrier ring for a solid rubber tire, consisting in, conjointly rolling into a flat steel band grooves while said flat steel band is being rolled out to final dimensions, bending a cut length of said flat steel into a ring, cutting into the ends of said ring interengaging teeth, welding said ends after said teeth have been joined so as to engage each other, and compressing said so welded ring to the required accurate internal diameter by radially forcing it upon a core piece.

MAX HERING.